United States Patent [19]

Shaheen et al.

[11] Patent Number: 6,032,227
[45] Date of Patent: Feb. 29, 2000

[54] SYSTEM AND METHOD FOR CACHE MANAGEMENT IN MOBILE USER FILE SYSTEMS

[75] Inventors: Amal Ahmed Shaheen; Krishna Kishore Yellepeddy, both of Austin, Tex.

[73] Assignee: International Business Machines Corporation, Armonk, N.Y.

[21] Appl. No.: 09/195,016

[22] Filed: Nov. 18, 1998

Related U.S. Application Data

[62] Division of application No. 08/723,820, Sep. 30, 1996, Pat. No. 5,893,920.

[51] Int. Cl.[7] .................................................. G06F 12/08
[52] U.S. Cl. ........................... 711/129; 711/171; 711/173; 707/205
[58] Field of Search ................................... 711/118, 133, 711/171, 173, 129; 707/205

[56] References Cited

U.S. PATENT DOCUMENTS

| | | | |
|---|---|---|---|
| 4,410,946 | 10/1983 | Spencer | 711/137 |
| 5,226,141 | 7/1993 | Esbensen | 711/171 |
| 5,293,609 | 3/1994 | Shih | 711/137 |
| 5,386,536 | 1/1995 | Courts et al. | 711/136 |
| 5,577,226 | 11/1996 | Percival | 711/119 |
| 5,604,900 | 2/1997 | Iwamoto | 707/200 |
| 5,713,008 | 1/1998 | Falkner | 395/500 |
| 5,787,472 | 7/1998 | Dan et al. | 711/134 |

*Primary Examiner*—Hiep T. Nguyen
*Attorney, Agent, or Firm*—Mark S. Walker; Jeffrey S. LaBaw

[57] ABSTRACT

A system and method for managing a mobile file system cache to maximize data storage and reduce problems from cache full conditions. Cache management automatically determines when the space available in the cache falls below a user-specified threshold. The cache manager attempts to free space needed for caching the next object. Files are deleted from the cache if no server updates are pending and if such deletion will provide the needed space. If automatic deletion does not provide sufficient space, the user is prompted for action. The system user can control the cache by increasing or reducing its size and drive allocation and can explicitly evict clean files from the cache. Cache expansion can be to logical or physical storage devices different than those on which the original cache is stored. The system enables separate storage of temporary files allowing identification and deletion of such files.

16 Claims, 7 Drawing Sheets

SYSTEM AND METHOD FOR CACHE MANAGEMENT IN MOBILE USER FILE SYSTEMS

This Application is a divisional application of Ser. No. 08/723,820 filed Sep. 30, 1996 now U.S. Pat. No. 5,893,920.

BACKGROUND OF THE INVENTION

1. Field of the Invention

The present invention relates to the management of computer implemented file systems. In particular, the present invention relates to the management of caching in file systems for mobile users that routinely disconnect from a server file system.

2. Background and Related Art

Computer systems are used by companies and individuals to manage business and personal matters. The data manipulated by the computer user is stored in a file system resident on the user's computer or on a network server. Storing data on a network server has the advantage of making data available to other people in the company and of reducing the disk storage requirement on individual workstations. Portable computers with limited disk storage particularly benefit from network server storage.

Portable computers provide a computing solution for people who must travel as part of their job, who frequently take work home from their office, or, who for convenience, need to have portable computing solutions. These workers are frequently termed "mobile computer users" or simply "mobile users."

Mobile computing is greatly facilitated by systems and methods that allow the mobile users to connect to a network server and update shared files with the results of his or her work while disconnected. Early methods of resynchronization required the worker to manually copy and compare each file on which they had worked or thought they might have changed. Similarly, if network files had changed, the worker would have to check and copy those files to the portable computer. Newer methods include software programs that automatically compare and resynchronize a network and mobile computer. A specifically designed IBM Mobile File System, goes one step further providing tracking and resynchronization of files as part of a distributed file system function.

Mobile file systems have to support disconnections of clients from the servers to which they are normally connected. This support is provided by caching of files from the server to the client machine whenever a user accesses a file. Implicit caching is the process through which files the user is currently accessing are temporarily stored on the mobile device. The mobile user can then continue to access the files even when disconnected from the server. The user can update these cached files or create new ones. Any changes made to the cached files are logged by the file system and these files are flagged as 'dirty'. These 'dirty' files must remain in cache until the user reconnects to the server plays these changes back to the server. Mobile file system transaction logging is described in patent application Ser. No. 08/572,923, filed Dec. 15, 1995 entitled "Process and Article of Manufacture for Constructing and Optimizing Transaction Logs for Mobile File Systems."

Explicit caching occurs when the user specifies certain files are to be copied to the mobile machine for later use or update. The user can choose to cache files explicitly by creating a profile of files to be cached. Explicit caching is often called stashing, and is initiated by a user in anticipation of disconnection from the network server.

There is a limited amount of disk space available for caching on portable computers. This limit can be easily reached if the user caches a large number of files explicitly or implicitly while connected to the server. If the user is disconnected from the server for an extended period of time, he or she may completely fill the cache and reach a state where he or she is not able to create any new files or update existing ones. Files may exist that the user has completed working with, but to replace these 'dirty' files in the cache, the user would need to first replay and synchronize the changes to the server. A mobile user may not have this option at the time the cache fills. The caching methodology for mobile users must solve the technical problem of managing the cache so a mobile user can continue using the file-system for extended periods of time even while disconnected. Adopting a standard cache replacement policy such as LRU (Least Recently Used) does not by itself meet the requirements of a mobile user since it does not consider the need to resynchronize files with a server. In addition, the caching mechanism must work in a computer system environment that does not reserve an exclusive, fixed size partition for the cache. The lack of a fixed size cache complicates cache management because it imposes a further limit on the amount of space that can used for caching, because the limited portable disk space also is being used for unrelated user and system activity.

File systems such as Coda, that support mobile users, cache files to support disconnections from the network. Coda assigns a priority to each entry in the cache. This priority is a function of an explicit priority specified by the user and an implicit reference priority. The reference priority of an object is based on the total number of references that have occurred since it was last referenced. Coda does not allow the user to explicitly evict cached data. Also, Coda assumes that a partition of fixed size is reserved for the cache. The size of this partition cannot be dynamically varied. See Satyanarayanan et al, "Coda: A Highly Available File System for a Distributed Workstation Environment", *IEEE Transactions on Computers*, Vol. 39, No. 4, April 1990; Kistler and Satyanarayanan, "Disconnected Operation in the Coda File System", *ACM Transactions on Computer Systems, February* 1992; and Kistler, "Disconnected Operations in a Distributed File Systems", Ph.D. this is, Department of Computer Science, Carnegie Mellon University, May 1993.

SUMMARY OF THE INVENTION

The present invention overcomes existing mobile file system limitations by providing specific mobile file system cache management features. The present invention overcomes the existing problem of evicting cached data in secondary storage incorrectly, i.e., evicting the data to accommodate new data only to find that even after the evictions insufficient space is available for this new data. The present invention also handles the mobile file system constraint that file system cache space is not exclusively reserved for caching. It does so by providing support for dynamic expansion and reduction of the cache size, and support for the cache spanning multiple drives on the system. The present invention provides the user with greater control over the contents of the cache, the proposed invention allows the user to evict data from the cache explicitly. Finally, the file-system maintains a separate cache for temporary files that are created by applications such as editors and word-processors and reserves the main cache for data that is of importance to the user.

The present invention is directed to providing a mobile file system cache management process that addresses mobile cache space limitations. The present invention receives a user specification of the amount of space to be allocated for caching. As files are implicitly or explicitly cached, the cache management process verifies the available space. If insufficient space remains to cache the next requested file, the cache manager takes one of several actions. The cache manager first attempts to remove cached files that are not 'dirty.' The cache manager analyzes the amount of space this action will recover and initiates removal only after determining that sufficient space will be freed to store the requested file. If file removal is unsuccessful, the system notifies the user and allows the user to increase the cache size and to allow expansion of the cache to other physical or logical drives. The user may also reduce cache commitments. The user is presented with an option to evict cached files, which he or she may do to remove unneeded files. Finally, the present invention tracks cache requests and enables caching of files once cache space becomes available.

The present invention is directed to a system for managing a file system cache in a computer system having a processor, memory and first and second file system storage, the computer system is removably connected to the first file system storage, and selected data from the first file system storage is stored in a file system cache in the second file system storage for use when the computer system is disconnected from the first file system, the system comprises, means for receiving a request to store additional data in the file system cache, the additional data requiring a first amount of storage; means for testing to determine whether or not the file system cache has the capacity to store the first amount; means for storing the additional data if the file system cache has capacity; and means for deleting cached data to make space available only if the cached data to be deleted does not contain pending modifications to server data and the deletions will free space sufficient to store the first amount of data.

It is therefore an object of the present invention to provide a cache management system that implements a replacement policy that preserves files with updates that need to be synchronized back to a server.

It is yet another object of the invention to provide a system and method for cache management that presents options to the system user to allow interactive cache management in response to cache limit detection.

It is yet another object of the invention to enable dynamic evaluation of cache space availability so that additional files may be cached as space becomes available.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
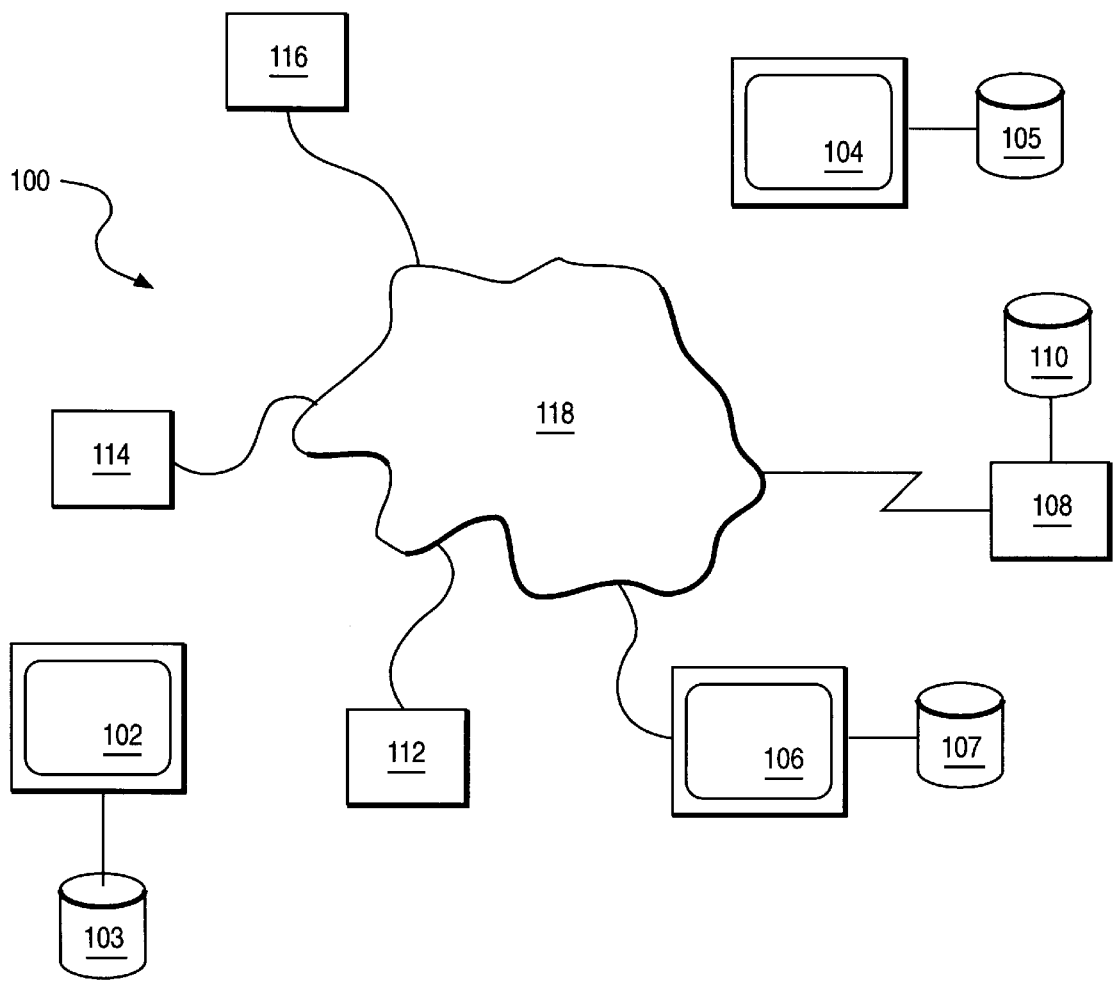
FIG. 1 is a block diagram illustrating a data processing system according to the present invention.

A data processing system according to the present invention is shown in FIG. 1. The overall clustered or distributed system 100 comprises a number of clients and servers interconnected by a network 118. Network 118 may be a local area network (LAN) serving a small business, corporate department or similar entity, or it may include wide area network components interconnecting geographically dispersed sites. Network 118 may also be a private network, e.g. a high speed fiber optic connection or a switch connecting a cluster of machines. The present invention is applicable in all these cases.

Clustered or distributed system 100 includes servers 102, 104, and 106, each of which has non-volatile storage 103, 105, and 107. The non-volatile storage may be magnetic hard disks, optical disks or similar technology. Each of the servers may have any number of each of these types of storage devices. Server systems typically contain large amounts of non-volatile storage having capacities exceeding one gigabyte.

Client workstations 108 112 114 116 are connected to the network and are able to use the services of one or more of servers 102 104 106. A client may have its own non-volatile storage, (e.g. 110) or may rely totally on a server for non-volatile storage. A particular client, e.g. 106 may be a portable computer or other mobile client that can be disconnected from the network and operated independent of the network.

The configuration of system 100, including the number and configuration of clients and servers, is provided only as an example and is not intended to limit the scope of the invention in any way.

Figure 2:
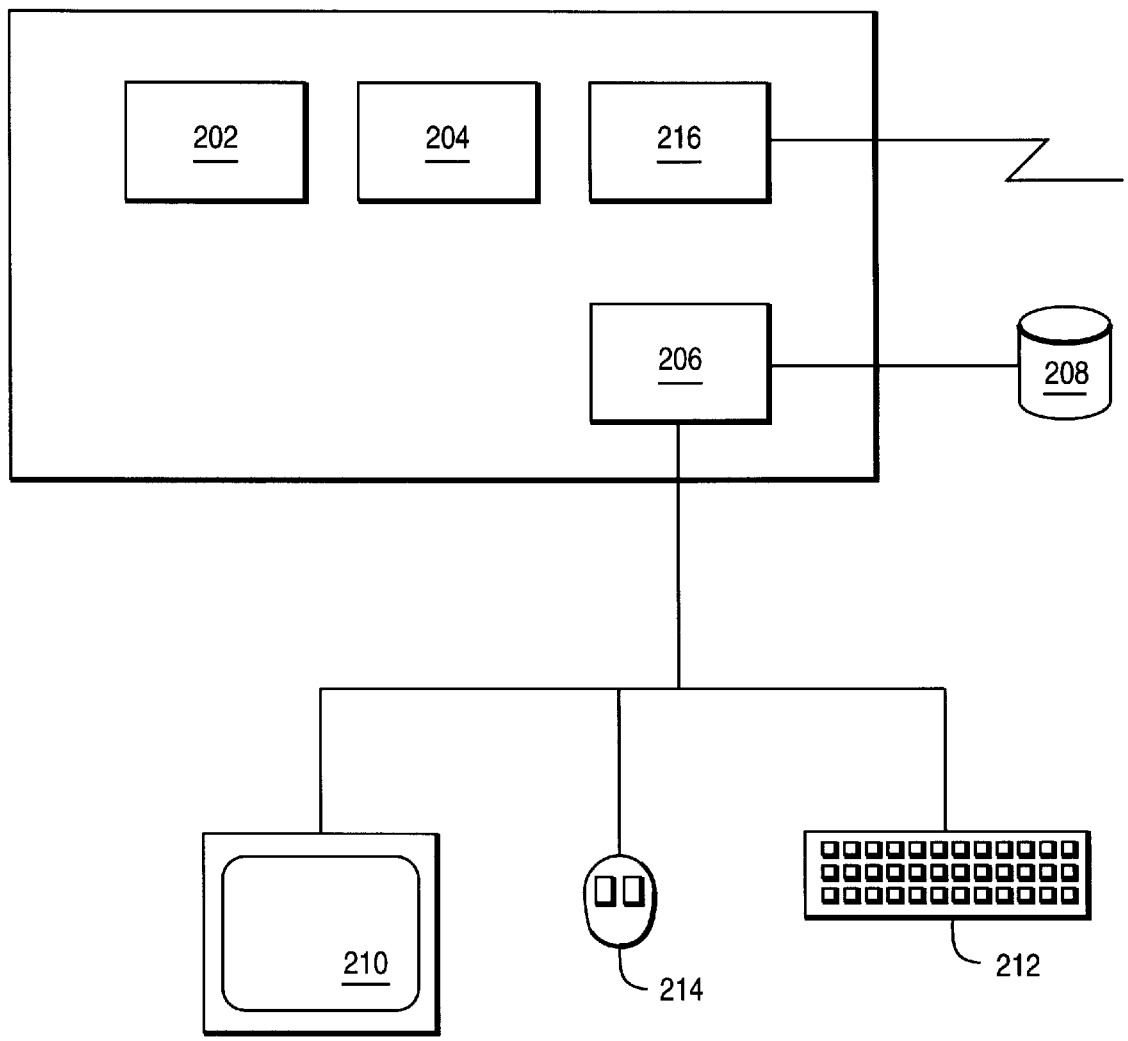
FIG. 2 is a block diagram of a typical server component of the data processing system according to the present invention.

The present invention is implemented within the client file system. An example of a client as used by the present invention is shown in FIG. 2 generally at 200. A client can be any computer system such as an IBM Thinkpad Model 560 or a portable IBM RISC System/6000 (IBM, Thinkpad, and RISC System/6000 are trademarks of the IBM Corporation.) Client 200 has one or more processors or CPUs making up a processor element 202. Processor element 202 has access to volatile memory 204. The processor also controls Input/Output unit 206, which controls access to non-volatile storage, such as hard disk 208, and to input/output devices such as display 210, keyboard 212, and pointing device 214. Other I/O devices could be attached to the input/output unit such as a diskette drive, a CD-ROM drive and other multimedia devices. Network communications is handled by network controller 216. Network controller 216 performs the services necessary to control access to the network including the servers on the network. The physical network can be a token ring, Ethernet or other network. The network protocol can be TCP/IP, NETBIOS, NetWare, or other protocol allowing access to resources and transmission of messages over a network.

Implementation of the present invention is not dependent on client or server operating system, client/server protocol, network protocol or physical file system. Thus, the present invention may be implemented in a many different and mixed environments, with operating systems including IBM AIX, IBM OS/2, Microsoft Windows NT, and other operating systems.

Figure 3:
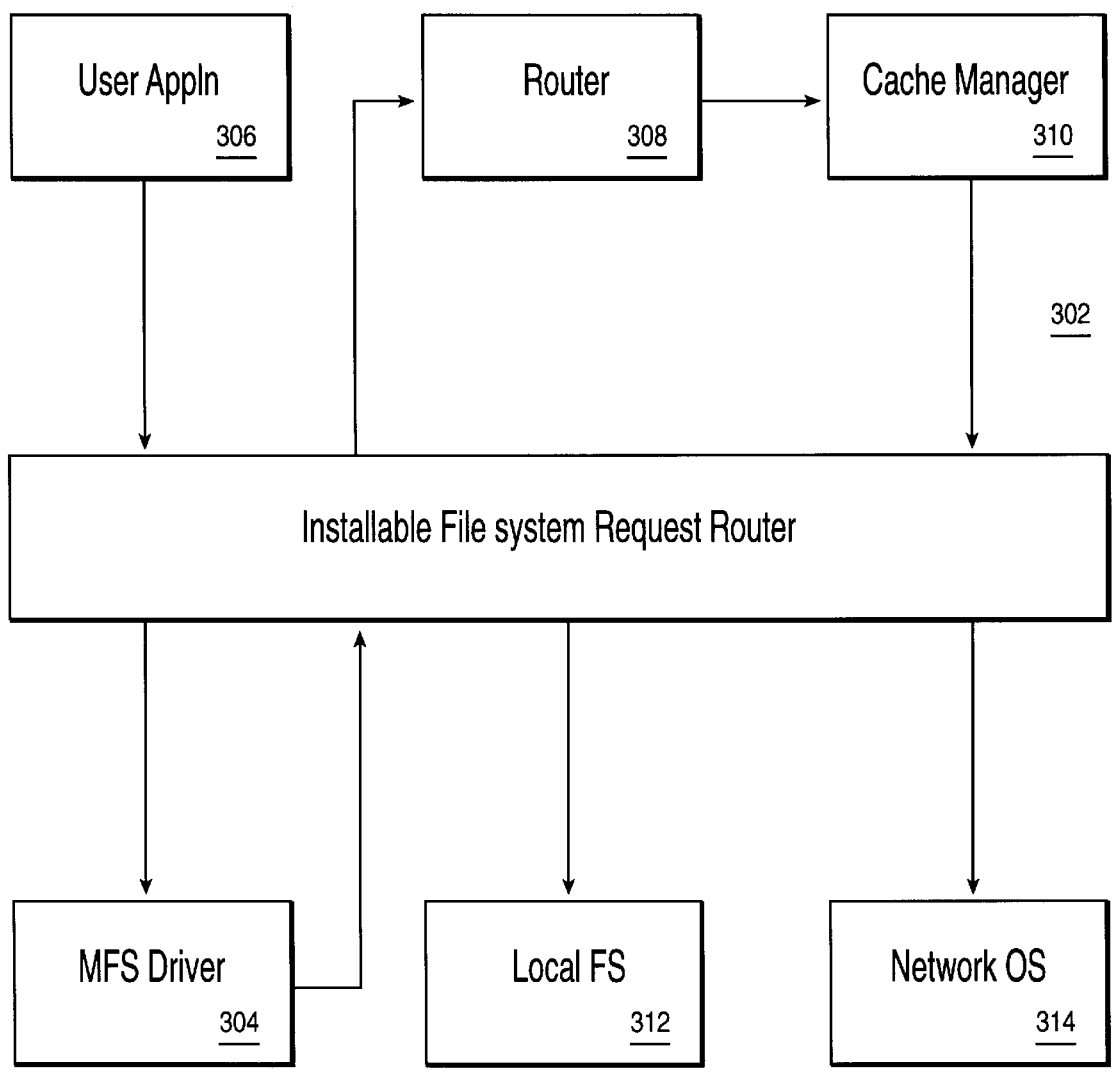
FIG. 3 is a block diagram of a system with an installable file system including a mobile file system.

FIG. 3 illustrates a mobile file system according to the present invention. The mobile file system is implemented within the client and the server operating system. The mobile file system of the preferred embodiment is implemented as an installable file system (IFS). The Installable File System request router 302 routes file system requests from a user application 306 to the appropriate file system. The installed file system can be one or more local file systems 312, a network file system 314 connected through a network operating system such as IBM LAN Requester or Novell NetWare. Examples of other installable file systems are the IBM HPFS file system available with the OS/2 operating system.

The mobile file system driver 304 receives file system calls from the installable file system router. These requests are routed to a user level mobile file system router 308 that services file system requests. These requests are, in turn routed to the cache manager 310 that uses file system calls through the installable file system request router 302 to access the locally cached file in the local file system 312, or the server version of the file through the network file system 314. When the mobile file system is disconnected, only the local data is available.

The present invention is implemented in the cache manager 310 for managing a local cache on the local file system 312. A single cache manager may, according to the present invention, manage a single local cache spread over multiple local file system volumes having the same or different file system protocols.

The mobile file system cache manager 310 maintains a list of the names of files and directories that have been cached. Each file or directory is referenced as a file system object. Entry status information is maintained along with the name of the file or directory. The status information consists of the last modify date and time, last access date and time, size of the file, and any file-attributes associated with the file. In addition to the caching of status for a file, the contents of the file or data may also be cached depending on the particular file system call. In the preferred embodiment, the file-system sets a limit on the number of files that can be cached, and on the amount of disk storage (in bytes) available for use by the cache. These limits are user configurable parameters set according to the available system resources and the anticipated amount of caching. For example, these parameters are specified in the CONFIG.SYS file in OS/2. If the user reaches the maximum file system object limit, then one or more of the cache entries must be replaced for caching additional file system objects.

The type of the file system request causes either the caching of only the name and status information for the file system object, or the caching of name, status and data. An OS/2 "dir" command that results in a display of all the entries in the current directory would require the caching of status for a file system object but no caching of data. On the other hand, opening a word-processing document would lead to caching of the document data as well as the name and status information.

A least recently used replacement policy is used to select and remove cached file system objects to accommodate a new entry when no data is cached. In the more complicated case requiring data caching, the preferred embodiment first checks whether replacement of the selected entries from the cache will provide sufficient storage for the new object. If sufficient storage will not be available even after removing entries from the cache, none of the cached data is removed, and an error is returned to the user informing him or her that insufficient cache space is available. The advantage of this method is that cached data on disk is removed only if the space is sufficient to accommodate new data that the file-system is trying to cache.

In addition to returning an error message, the preferred embodiment of the invention allows the user to dynamically expand or reduce the size of the cache. This dynamic variation in the size of the cache can be both usage driven and user driven. The file-system can be configured to automatically increase the size of the cache if additional cache space is required without asking the user. This usage driven dynamic extension of cache size is transparent to the user and is triggered when the free space in cache falls below a pre-assigned percentage of the total cache size. User driven expansion of the cache allows the user to increase the size of the cache in anticipation of caching a large amount of data which may exceed the current cache size. The file-system allows the user to specify the additional space required and the drive where the cache will reside. The drive specified can be any existing hard drive on the system and need not be the drive used for the original cache. Information is maintained for each cached file about the drive on which the data is cached to support caching across multiple drives.

The file system also allows the user to relinquish the additional space requested. The file-system lists the files that are candidates for replacement on each drive to help the user select the files to remove. A file is a candidate for replacement if it is not presently open for use. This definition includes files that are "clean" as well as "dirty." Within the list of files cached on each drive the files are sorted by order of the least recent use. A warning message is displayed by the file-system if the user selects a dirty file to be evicted and the user is also prompted to confirm such a selection. If the user still decides to evict a dirty file, the corresponding store entry for the dirty file is removed from the transaction log. Giving the user the ability to evict clean as well as dirty files gives the user greater control over the contents of the cache. For example, the user may have cached from the server all of the executables necessary for using a word processor. In disconnected mode the user invokes these executables to edit a document and may realize he or she has no further use for the word-processor during this disconnected session. The user knows that these executables can be evicted from the cache immediately, but a standard cache replacement algorithm has no way of knowing this is a possible action.

The explicit user eviction of clean cache files from the cache is not logged. This ensures that the file will not be deleted from the server when the user reconnects to the server and all modifications to files made by the user while disconnected are replayed to the server. On the other hand, eviction of a "dirty" file from the cache causes deletion of the log entries for that file in the transaction log. Allowing the user to evict cached data which the user knows will not be needed is a powerful feature for reclaiming valuable cache space.

The preferred embodiment uses a separate cache for the caching of temporary files. Temporary files are created by many applications such as word-processors and text editors, and are usually deleted once the application terminates. A separate cache for temporary files is used to store these files instead of using the main or primary cache. The advantage of this feature is that important data which may have been cached by a user for use while being disconnected from the server will not have to contend for space in the. cache with temporary files, and will not run the risk of being replaced by those temporary files.

A further complication arises in a typical caching system when space is not reserved on disk for exclusive use by the caching function of the file system. Without exclusive cache space, the file system may find that the cache space limit has not been reached, but no space is available for caching due to other system activity.

If disk space is freed later, the file-system can attempt to cache data that it was not able to cache earlier. The preferred embodiment runs a daemon in the background that periodically calculates the free space available on disk. Periodic free space determination is especially useful if the file system provides support for stashing of files. Stashing is the explicit caching of files by a user. Stashing allows a user to cache files in anticipation of a disconnection from the server. The list of files to be stashed is specified in a profile by the user. Once the file system detects that additional space has become available, it stashes data that it was not able to stash earlier. Files that have been stashed are compressed before caching. A "file-compressed" flag is maintained in the file system object record to indicate that the file is compressed. When a file is to be provided to the user from the cache, the "file-compressed" flag is checked and the file is decompressed if required. When the file is decompressed, cache space is expanded automatically, if necessary. Once the file has been decompressed, the compressed copy is deleted.

The cache management process of the preferred embodiment of the present invention is illustrated in FIG. 4. The process starts at 402 and immediately proceeds to step 404 where the installable file system (IFS) router receives a file system(FS) request. The request is tested to determine whether it is for an installed Mobile File System (MFS) 406. If not, the request is routed to the appropriate file system driver and a result returned to the user 408. If the request is for the Mobile File System, the process dispatches a thread to handle the file system request 410. The request is tested to determine whether it will result in caching of file data 412. As discussed above, certain operations, such as opening a new file, lead to caching of data. Others, such as listing a new directory, will cache only file system information not data.

If no file data is to be cached, the cache manager attempts to cache the name and status of the file system object 414. The cache manager tests whether the name and status for the object are already cached 416. If so, the cache manager tests whether the client is connected to the server 418. If connected, the MFS client fetches the latest status information from the server and updates the cache 419. Results are returned to the user if not connected to the server or after updating the status 420.

If the name and status have not previously been cached, the cache manager tests to determine whether an empty free list entry is available for the new object 422. If not, a least recently used (LRU) policy is used to evict a name and status entry from the list to make a free entry 424. The new name and status entry is added to the free list entry 426 and results are returned to the user 428.

If file data is to be cached, the cache manager first checks to see whether file data for this file system object is already in the cache 430. If so, the cache and server copies are compared 431. If the copies are the same, the cache priorities are recomputed 454 and results returned to the user 456.

If the file data is not already in the cache or if the cache version is different than the server version, the cache manager tests whether there is enough space in the cache for the file 432. If so, the file is cached 452 and cache priorities are recomputed 454. If insufficient space is available, the cache manager examines the files in the cache to determine which of them are subject to replacement 434. The file sizes of the replaceable files are summed and compared to the size of the file to be cached 436. If the summed size is greater, a sufficient number of files is removed to create the needed space and the file is cached 438. The remaining available space is compared to a preset percentage of the total cache 440. If the available space is not less than the percentage, the cache manager recomputes caching priorities 454 and returns results to the user 456.

If the replaceable files do not provide sufficient space, or if the remaining available space is less than the specified percentage, the cache manager increases cache size by a predefined percentage 442. The additional cache space is allocated by searching available disk drives in the order specified by the user for allocable space, and the space is allocated from the first drive in which the space is available.

If the cache expansion was successful 444, the cache manager checks whether any file cache requests are outstanding 450. If a file cache request is outstanding, the file is cached 452, and the cache priorities recomputed 454.

If the cache expansion was not successful, the cache manager checks whether the file was successfully cached before the requested expansion 446. If not, an error is returned to the user 448. If the file was cached, then priorities are recomputed 454 and a successful message is returned to the user 456.

Figure 5:
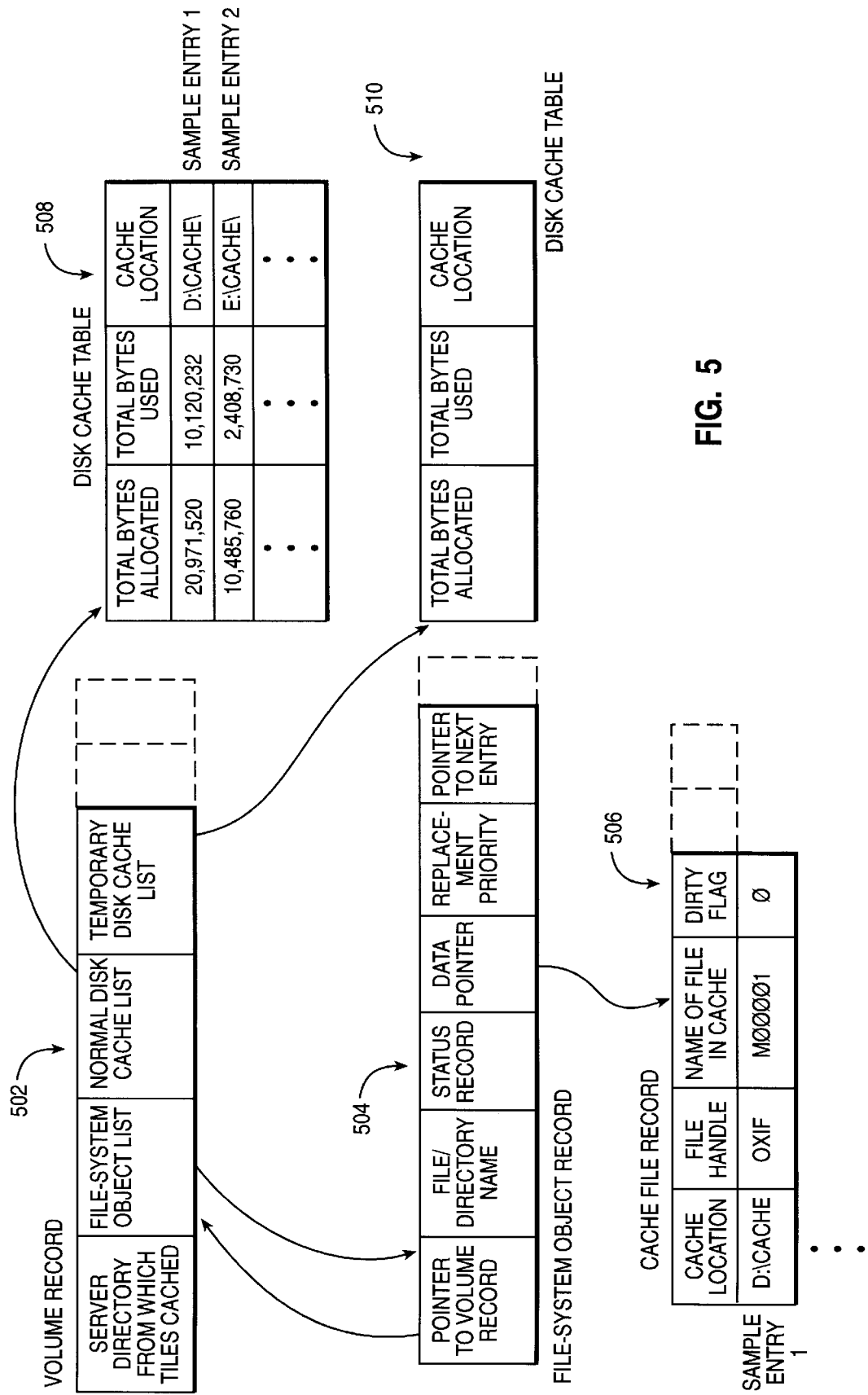
FIG. 5 is a block diagram depicting the system tables of the present invention.

FIG. 5 is an illustration of the system tables maintained by the cache manager according to the present invention. The Volume Record 502 contains information on the server from which the files were cached, a file system object list, a normal file disk cache list, and a temporary file disk cache list. The file system object list contains a file system object record 504 for each file system object. This record contains a pointer to the volume record, a file/directory name, a status record, a data pointer, a replacement priority and a pointer to the next file system object entry. The data pointer points to a cache file record 506 that includes the cache location, the file handle, the name of the file in cache and clean/dirty flag. The normal file disk cache list points to a disk cache table 508 that lists the total bytes allocated and used for each cache location used for normal file caching. A temporary file disk cache table 510 contains similar information for each cache location used to store temporary file information.

The preferred embodiment implements a system and process for cache management that enables the following mobile user cache functions: 1) enforcement of a replacement policy that removes clean files from the cache only if the space freed by the removal will accommodate the new file to be cached; 2) expansion of the cache space based on usage or user selection; 3) support for disk cache for which there is no fixed partition and support for a cache spanning multiple drives on a system; 4) reduction of the cache size by eviction of user specified files from the cache, provided the files are not presently in use; 5) user specified eviction of clean files from the cache when disconnected from the server without logging the eviction; 6) user specified eviction of dirty files from the cache when disconnected from the server accompanied by removal of the corresponding store entry in the transaction log; 7) allocation of a separate cache for caching temporary files; 8) detection and use of newly freed disk space for stashing files that could not previously be stashed; and 9) compression of stashed files and decompression of these files when the user tries to open the files.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A method of managing a file system cache in a first computer system having a processor, memory and storage means, said file system cache occupying at least two cache areas of said storage means with each cache area having a different cache management policy, the method comprising the steps of:

setting a respective first size of each of said cache areas in said storage means;

testing the amount of free space in a selected cache area in response to a request to store a file system object in said file system cache, the selected cache area determined by the cache management policy appropriate for a degree to which the file system object should be persistently stored in a memory of a second computer system, the file system object containing at least some data unique to the first computer system;

expanding the size of said cache without operator intervention if said testing determines that the free space is less than a first amount.

2. The method of claim 1, wherein the file system cache has a temporary cache area and a primary cache area, further comprising the steps of:

determining whether the request to store is for a temporary file which will be deleted when a requesting application terminates or for a persistent file which will be persistently stored in the memory of the second computer system after the requesting application terminates; and responsive to the determination that the request to store is for a temporary file, storing the temporary file in the temporary cache area.

3. The method of claim 1, further comprising the steps of:

receiving a user input to increase one of said cache areas by an amount; and expanding the size of said cache area by said user input amount.

4. A system for managing a file system cache in a mobile computer system having a processor, storage and user interaction means, the system comprising:

means for receiving a request from said user interaction means to change the amount of said storage allocated to said file system cache while the mobile computer system is in a disconnected state relative to a network;

means for receiving a storage location specification for said file system cache from said user interaction means;

means for changing the file system cache size in response to the amount and the storage location specification received without interrupting computer system operation so that additional files modified by the mobile system can be stored in the file system cache until the mobile system is in a connected state relative to the network and can be transferred to a file system coupled to the network.

5. The system of claim 4, wherein the storage location specification is for a logical storage device different from the logical storage device of said file system cache.

6. The system of claim 4, wherein the storage location specification is for a physical storage device different from the physical storage device of said file system cache.

7. A computer program product in a computer readable medium for managing a file system cache in a first computer system having a processor, memory and storage means, the file system cache having at least primary and temporary cache areas of the storage means, comprising:

means for managing a primary cache area for persistent files having data first modified by the first computer system and persistently stored after an owning application is terminated according to a first cache management policy;

means for managing a temporary cache area for temporary files which are deleted after an owning application is terminated according to a second cache management policy;

means for setting an initial size of each of the cache areas in the storage means;

means for testing the amount of free space in a selected cache area in response to a request to store a file system object in the file system cache, the selected cache determined by whether the file system object is a temporary file or a persistent file; and means for expanding the size of the selected cache area without operator intervention if said testing determines that the free space is less than a first amount.

8. The product as recited in claim 7, further comprising:

means for receiving a user input to increase one of the cache areas by an amount; and means for expanding the size of the cache area by the user input amount.

9. The product as recited in claim 8, further comprising:

means for listing a set of files which are candidates for removal from the cache area;

means for removing selected files from the cache area responsive to user selection of the selected files from the set of files.

10. The product as recited in claim 8, further comprising:

means for presenting a warning message to a user after selection for removal of a modified file.

11. A method for managing a file system cache in a mobile computer system having a processor, storage and user interaction means, the method comprising the steps of:

receiving a request from the user interaction means to change the storage allocated to the file system cache while the mobile computer system is in a disconnected state relative to a network;

receiving a storage location specification for the file system cache from the user interaction means; and changing the file system cache location in response to the storage location specification received without interrupting computer system operation so that additional files modified by the mobile system can be stored in the file system cache until the mobile system is in a connected state relative to the network and can be transferred to a file system coupled to the network.

12. The method as recited in claim 11, wherein the storage location specification is a logical storage device different from the logical storage device of said file system cache.

13. The method as recited in claim 11, wherein the storage location specification is a physical storage device different from the physical storage device of said file system cache.

14. A computer program product in a computer readable medium for managing a file system cache in a computer system having a processor, storage and user interaction means, the product comprising:

means for receiving a request from the user interaction means to change the amount of said storage allocated to the file system cache while the mobile computer system is in a disconnected state relative to a network;

means for receiving a storage location specification for said file system cache from said user interaction means; and means for changing the file system cache size in response to the amount and the storage location specification received without interrupting computer system operation so that additional files modified by the mobile system can be stored in the file system cache until the mobile system is in a connected state relative to the network and can be transferred to a file system coupled to the network.

15. The product as recited in claim 14, wherein the storage location specification is a logical storage device different from the logical storage device of said file system cache.

16. The product as recited in claim 14, wherein the storage location specification is a physical storage device different from the physical storage device of said file system cache.

* * * * *

UNITED STATES PATENT AND TRADEMARK OFFICE
CERTIFICATE OF CORRECTION

PATENT NO : 6,032,227
DATED : February 29, 2000
INVENTOR(S) : Amal Shaheen et al.

Figure 4A:
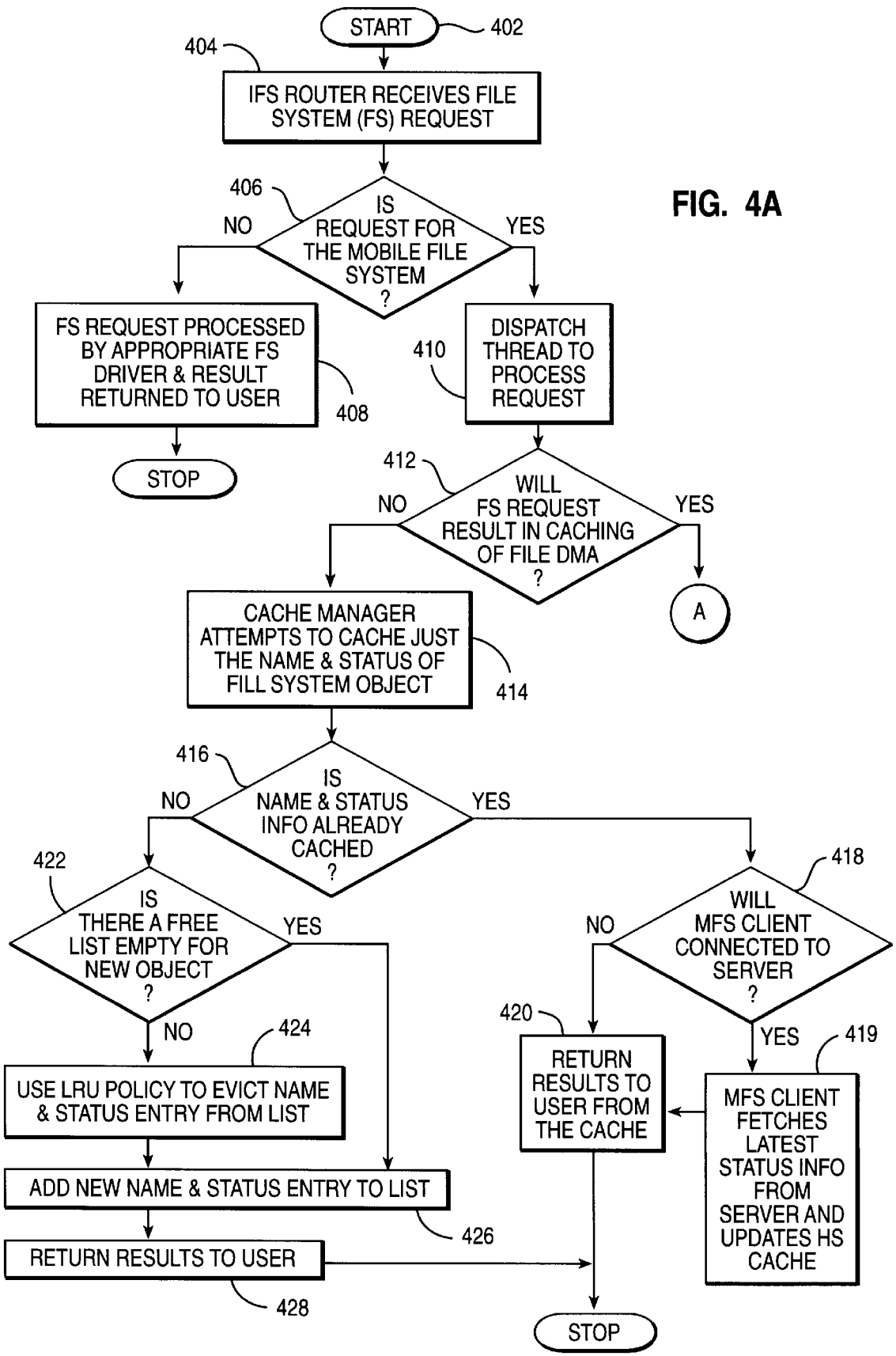
FIGS. 4A–4B are a flowchart describing the process of the preferred embodiment.
Figure 4B:
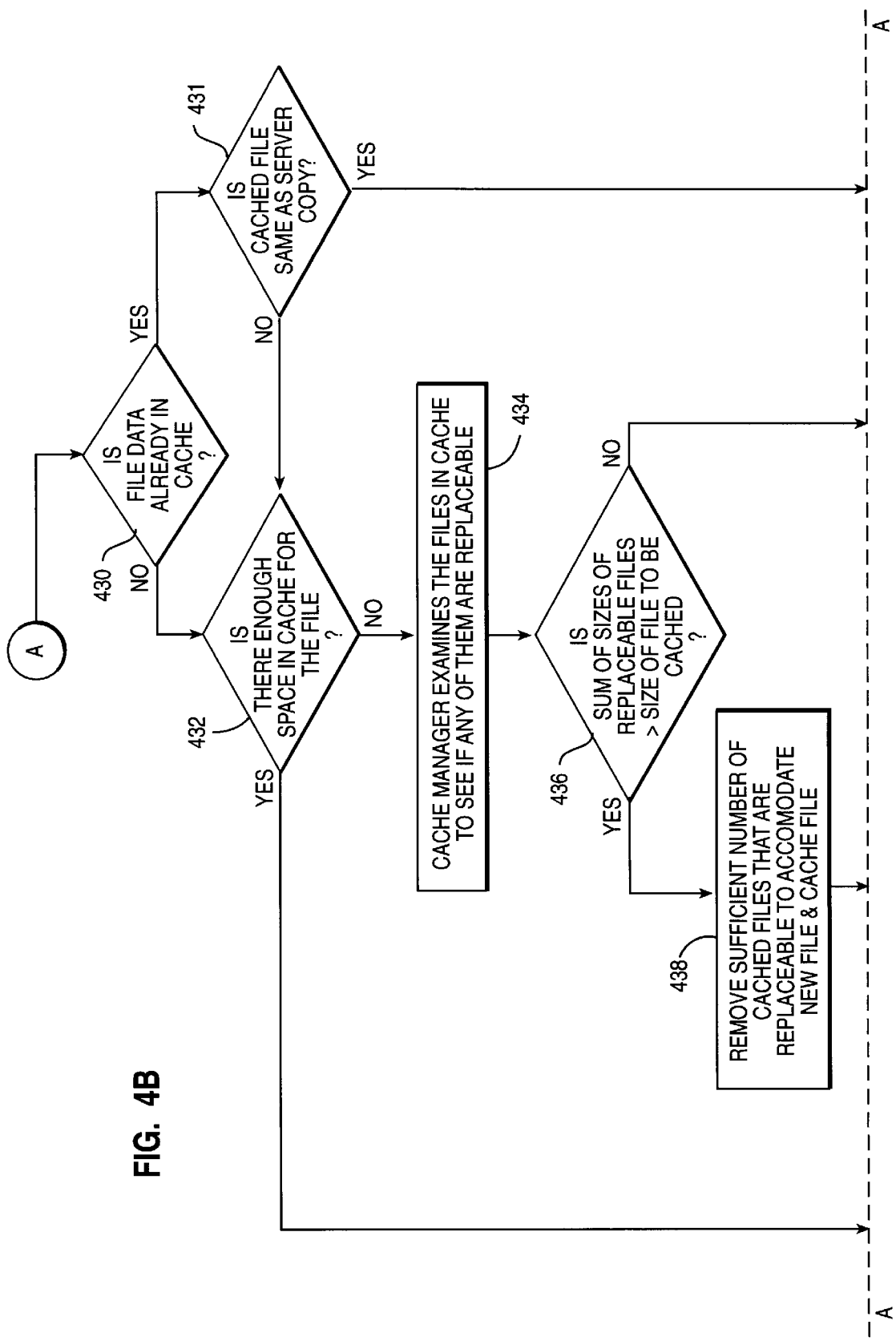
Figure 4C:
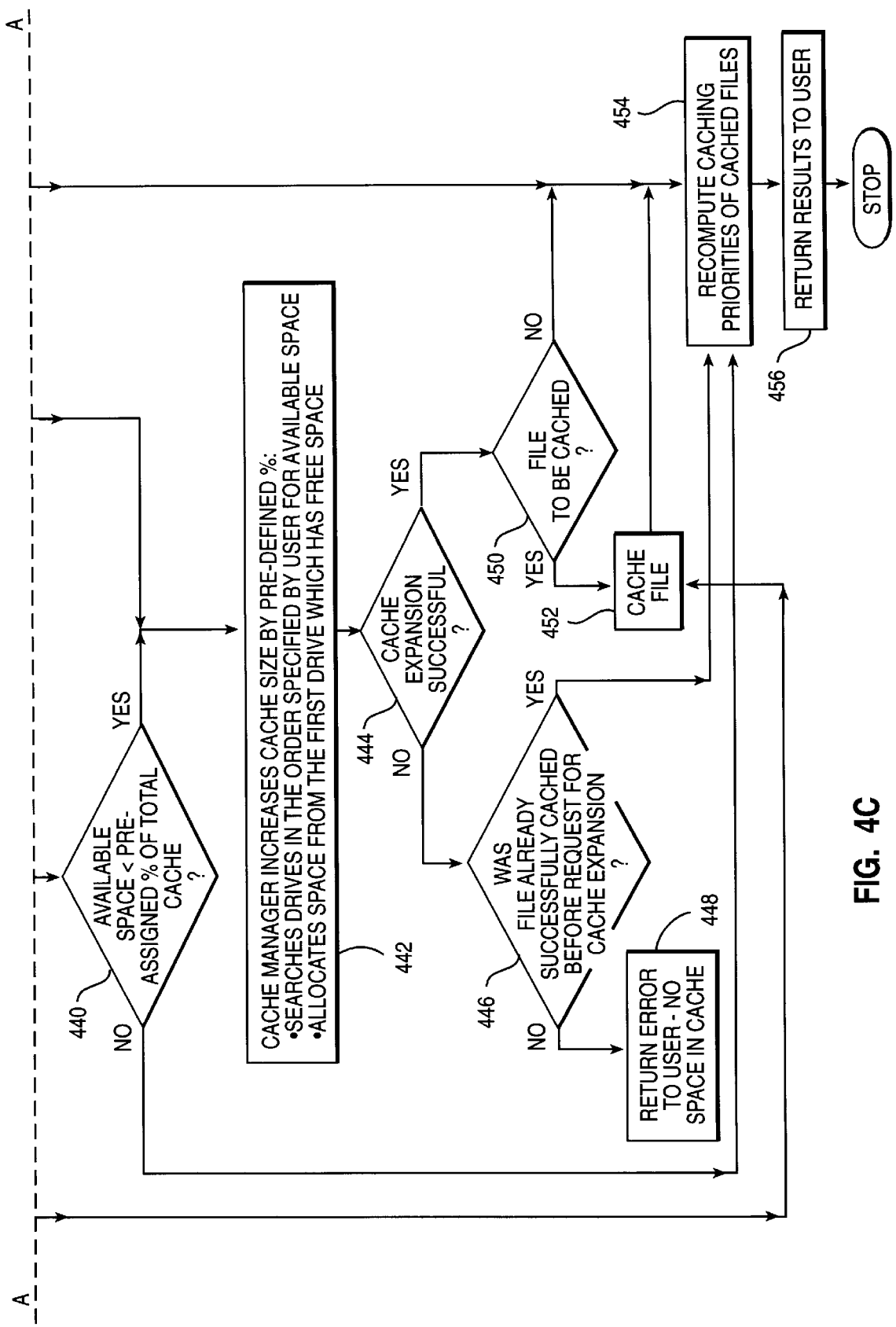

It is certified that error appears in the above-identified patent and that said Letters Patent is hereby corrected as shown below:

Col. 3, line 66, delete "FIGS. 4A-4B" and insert therefor --FIGS. 4A-4C--.

Col. 7, line 25, delete "FIG. 4" and insert therefor --FIG. 4A-4C--.

Signed and Sealed this

Sixth Day of February, 2001

Attest:

Q. TODD DICKINSON

Attesting Officer

Director of Patents and Trademarks